(12) United States Patent
Gibson et al.

(10) Patent No.: US 10,829,037 B2
(45) Date of Patent: Nov. 10, 2020

(54) TURN SIGNAL RESET DEVICE

(71) Applicants: William Gibson, Portland, IN (US);
Rocky Gibson, Portland, IN (US)

(72) Inventors: William Gibson, Portland, IN (US);
Rocky Gibson, Portland, IN (US)

(*) Notice: Subject to any disclaimer, the term of this patent is extended or adjusted under 35 U.S.C. 154(b) by 95 days.

(21) Appl. No.: 16/185,085

(22) Filed: Nov. 9, 2018

(65) Prior Publication Data

US 2020/0148101 A1  May 14, 2020

(51) Int. Cl.
*B60Q 1/42* (2006.01)
*B60Q 1/00* (2006.01)
*H01H 21/30* (2006.01)
*H01H 3/02* (2006.01)

(52) U.S. Cl.
CPC ............ *B60Q 1/425* (2013.01); *B60Q 1/0082* (2013.01); *H01H 21/30* (2013.01); *H01H 2003/0246* (2013.01); *H01H 2231/026* (2013.01)

(58) Field of Classification Search
CPC ........... B60Q 1/0082; H01H 2231/026; H01H 2003/0246; H01H 3/16
See application file for complete search history.

(56) References Cited

U.S. PATENT DOCUMENTS

| | | | | |
|---|---|---|---|---|
| 1,707,139 A | * | 3/1929 | Raab ..................... | B60Q 1/425 200/61.31 |
| 1,894,163 A | * | 1/1933 | Dal Porto .............. | B60Q 1/425 200/61.27 |
| 2,031,448 A | * | 2/1936 | Arcelon ................. | B60Q 1/425 200/61.32 |
| 2,291,141 A | * | 7/1942 | Breeze ................... | B60Q 1/425 200/61.34 |
| 2,299,876 A | * | 10/1942 | Breeze ................... | B60Q 1/425 200/61.34 |
| 2,554,057 A | * | 5/1951 | Petterson ............... | B60Q 1/425 74/484 R |
| 2,917,725 A | * | 12/1959 | Pearl ..................... | B60Q 1/425 340/476 |
| 3,809,833 A | * | 5/1974 | Miller .................... | B60Q 1/425 200/61.27 |
| 3,914,566 A | * | 10/1975 | Wendling .............. | B60Q 1/425 200/61.27 |
| D252,147 S | | 6/1979 | Nitach | |
| 5,923,010 A | | 7/1999 | Khoury | |
| 6,472,623 B1 | | 10/2002 | Hayashi | |
| 6,677,543 B2 | | 1/2004 | Takahashi | |
| 7,453,048 B2 | | 11/2008 | Cordier | |
| 8,552,319 B2 | | 10/2013 | Nakamura | |
| 9,598,006 B2 | | 3/2017 | Kim | |

* cited by examiner

*Primary Examiner* — Felix O Figueroa

(57) ABSTRACT

A turn signal reset device for a signal switch assembly of a vehicle includes a return stalk, a tab, and an actuator. A coupler is coupled to a first end of the return stalk and is configured to couple the return stalk to a signal stalk of a signal switch assembly that is coupled to a steering column of a vehicle. A second end of the return stalk, to which the actuator is coupled, is positioned proximate to the steering column. A connector that is coupled to the tab is configured to couple the tab to the steering column so that the tab extends radially from the steering column. Activating the signal stalk positions the actuator to selectively engage the tab as the steering column rotates. The actuator is configured to actuate the signal stalk to reset the signal switch assembly to a neutral configuration.

6 Claims, 5 Drawing Sheets

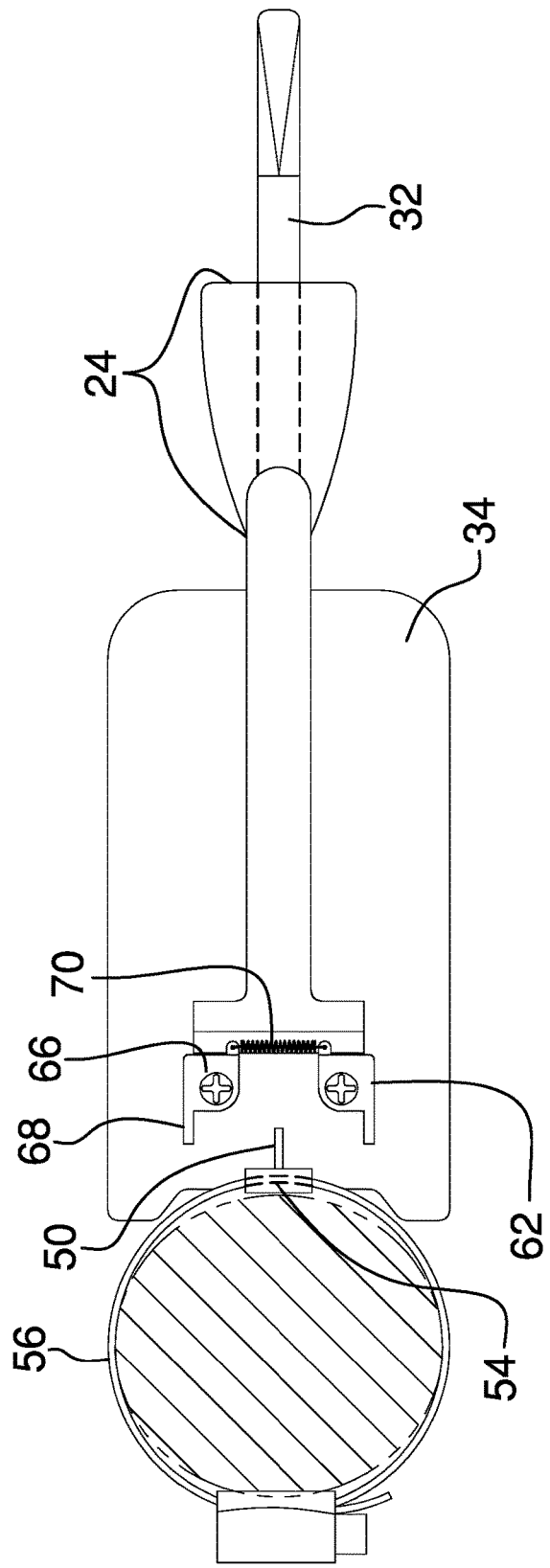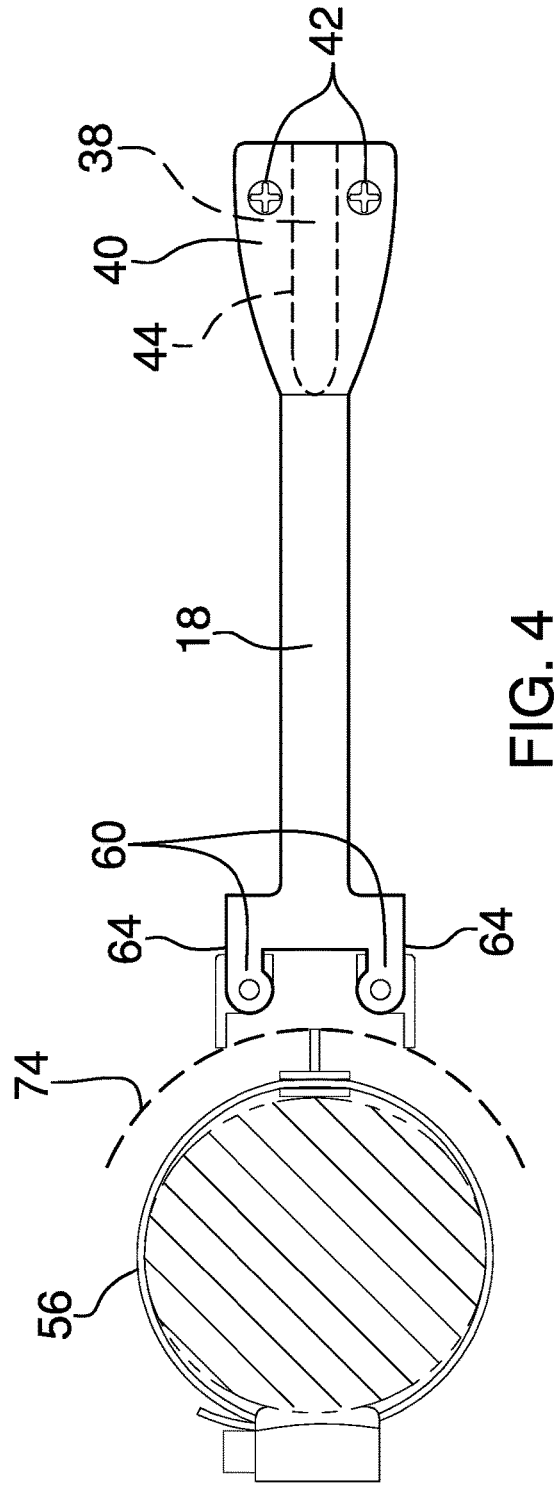

TURN SIGNAL RESET DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to reset devices and more particularly pertains to a new reset device for a signal switch assembly of a vehicle.

BRIEF SUMMARY OF THE INVENTION

An embodiment of the disclosure meets the needs presented above by generally comprising a return stalk, a tab, and an actuator. A coupler is coupled to a first end of the return stalk and is configured to couple the return stalk to a signal stalk of a signal switch assembly that is coupled to a steering column of a vehicle. A second end of the return stalk, to which the actuator is coupled, is positioned proximate to the steering column. A connector that is coupled to the tab is configured to couple the tab to the steering column so that the tab extends radially from the steering column. Activating the signal stalk positions the actuator to selectively engage the tab as the steering column rotates. The actuator is configured to actuate the signal stalk to reset the signal switch assembly to a neutral configuration.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a bottom view of an embodiment of the disclosure.

DETAILED DESCRIPTION OF THE INVENTION

Figure 1:
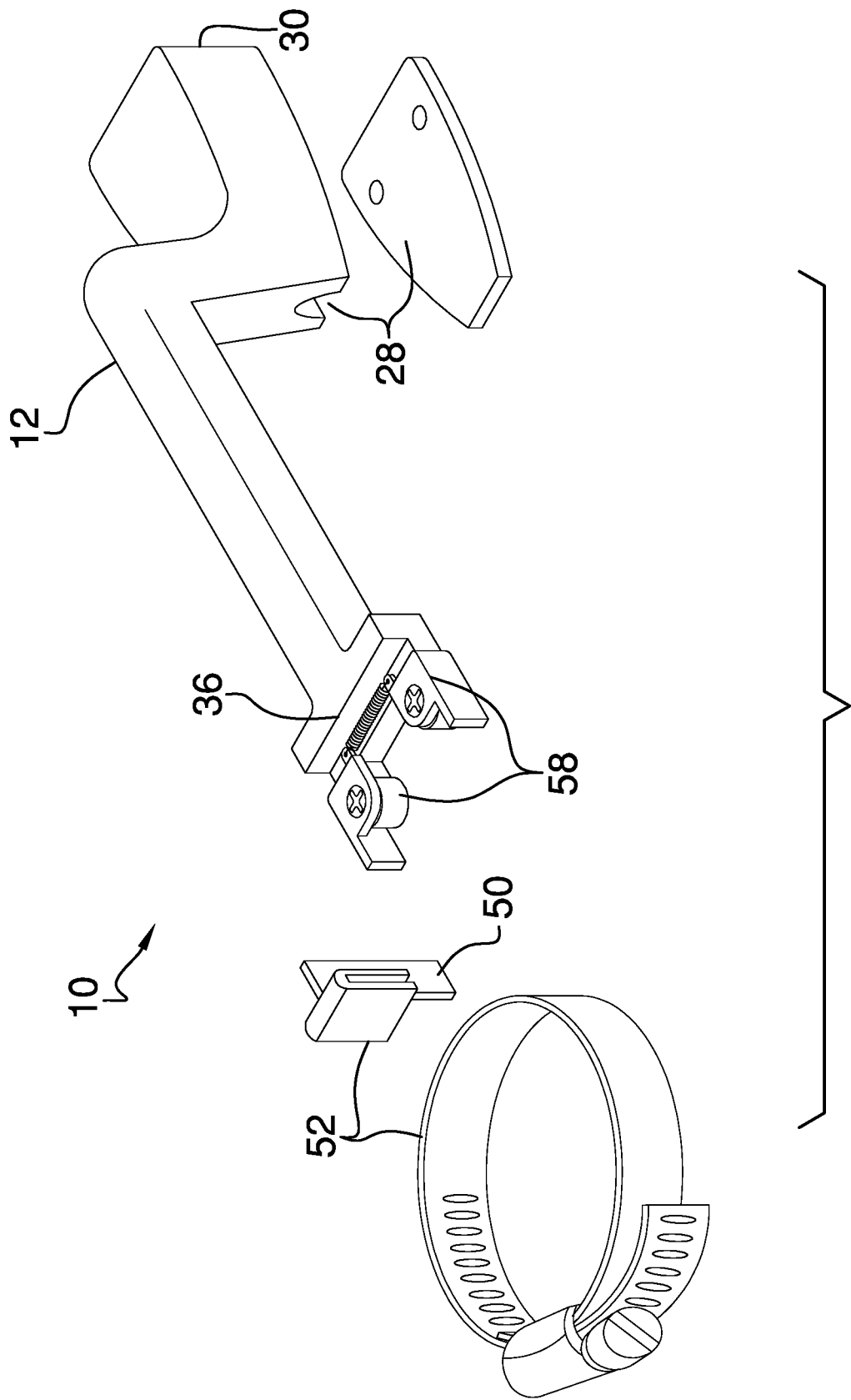
FIG. 1 is an exploded view of a turn signal reset device according to an embodiment of the disclosure.

With reference now to the drawings, and in particular to FIGS. 1 through 7 thereof, a new reset device embodying the principles and concepts of an embodiment of the disclosure and generally designated by the reference numeral 10 will be described.

As best illustrated in FIGS. 1 through 7, the turn signal reset device 10 generally comprises a return stalk 12. The return stalk 12 comprises a first bar 14, a second bar 16, a third bar 18, a fourth bar 20, and a fifth bar 22. The second bar 16 is coupled to and extends substantially perpendicularly from a respective opposing endpoint 24 of the first bar 14. The third bar 18 is coupled to and extends substantially perpendicularly from the second bar 16 distal from the first bar 14 so that the third bar 18 is opposingly positioned on the second bar 16 relative to the first bar 14. The fourth bar 20 is coupled to and extends bidirectionally from the third bar 18 distal from the second bar 16 so that the fourth bar 20 is perpendicular to the second bar 16. The fifth bar 22 is coupled to a lower surface 26 of the fourth bar 20 and extends opposingly to the third bar 18.

A coupler 28 is coupled to a first end 30 of the return stalk 12. The coupler 28 is configured to couple the return stalk 12 to a signal stalk 32 of a signal switch assembly 34 that is coupled to a steering column of a vehicle, such as an all-terrain vehicle and a golf cart, so that the return stalk 12 extends over the signal stalk 32 and the signal switch assembly 34. A second end 36 of the return stalk 12 is positioned proximate to the steering column.

The coupler 28 comprises a recess 38, a plate 40, and a pair of bolts 42. The recess 38, which is positioned in a lower face 44 of the first bar 14, is arcuate so that the recess 38 is complementary to the signal stalk 32 and configured to insert the signal stalk 32. A pair of channels 46 extends into the first bar 14 from the lower face 44 so that the channels 46 bracket the recess 38. The channels 46 are internally threaded. The plate 40 is shaped complementarily to the lower face 44 of the first bar 14.

A pair of holes 48 is positioned in the plate 40 so that each hole 48 is aligned with an associated channel 46 when the plate 40 is positioned over the lower face 44. The bolts 42 are complementary to the channels 46. Each bolt 42 is positioned to be inserted through a respective hole 48 and to be threadedly inserted into the associated channel 46 to couple the plate 40 to the first bar 14 so that the signal stalk 32 is fixedly coupled to the return stalk 12.

The device 10 comprises a tab 50 that is rectangularly shaped. A connector 52 is coupled to the tab 50 and is configured to couple the tab 50 to the steering column proximate to the signal switch assembly 34 so that the tab 50 extends radially from the steering column. The connector 52 comprises a clip 54, which is coupled to the tab 50, and a column clamp 56. The column clamp 56 is hose-type and is positioned to insert the clip 54. The column clamp 56 is configured to position around and to couple to the steering column proximate to the signal switch assembly 34 so that the tab 50 extends radially from the steering column.

An actuator 58 is coupled to a second end 36 of the return stalk 12. Activating the signal stalk 32, as required to signal a turn, positions the actuator 58 to selectively engage the tab 50 as the steering column is rotated to return the vehicle to a straight path after the turn has been completed. The actuator 58 is configured to actuate the signal stalk 32 to reset the signal switch assembly 34 to a neutral configuration, as is required when not signaling a turn.

The actuator 58 comprises a pair of extrusions 60 and a pair of brackets 62. Each extrusion 60 is coupled to and extends from a respective opposing end 64 of the fifth bar 22. The extrusions 60 are arcuate distal from the fifth bar 22. As will become apparent, the rounding of the extrusions 60 distal from the fifth bar 22 is required to allow the brackets 62 to pivot relative to the extrusions 60. The brackets 62 are L-shaped when viewed longitudinally, defining a top face 66 and a side face 68 of the bracket 62. Each bracket 62 is pivotally coupled by the top face 66 to a respective extrusion 60.

A spring 70 is coupled to and extends between the brackets 62. The spring 70 is coupled to the top face 66 of each bracket 62 so that the spring 70 is positioned over the fifth bar 22. The spring 70 is positioned to bias the pair of brackets 62 to a default configuration wherein the side face 68 of each bracket 62 abuts an associated extrusion 60 so that the bracket 62 is positioned to selectively pivot relative to the respective extrusion 60 concurrently with tensioning of the spring 70. The bracket 62 returns to the default configuration concurrently with rebounding of the spring 70.

Each of a pair of cutouts 72 is positioned in the top face 66 of a respective bracket. The side face 68 of the respective bracket 62 is positioned, with the signal stalk 32 in the neutral configuration, outside of an arc 74 that is defined by rotation of the tab 50 around an axis of the steering column. The side face 68 is positioned within the arc 74 when the signal stalk 32 is activated, positioning the tab 50 to contact the side face 68 of the respective bracket 62 to urge the signal stalk 32 to return to the neutral configuration.

Figure 2:
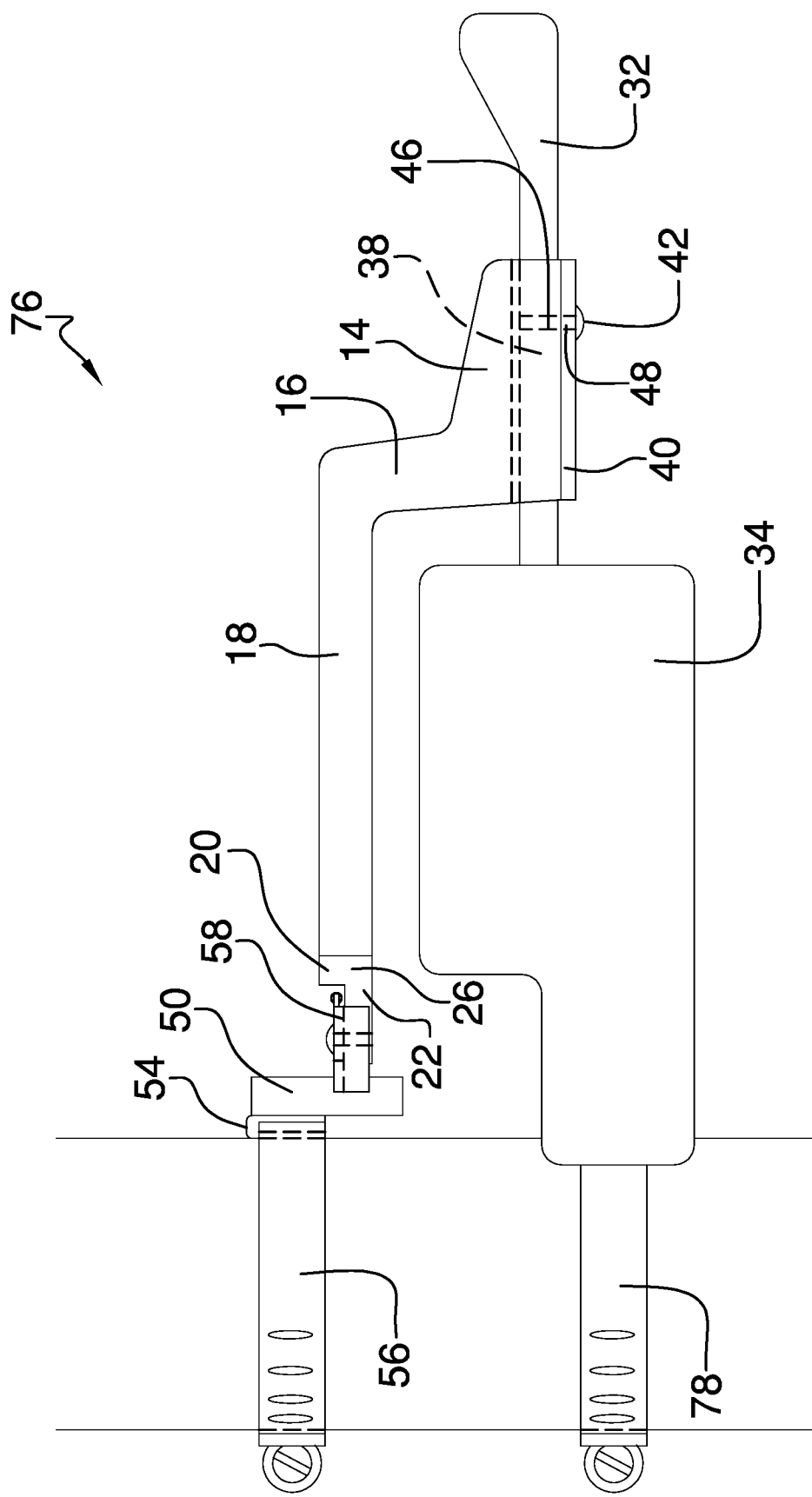
FIG. 2 is a side view of an embodiment of the disclosure.
Figure 5:
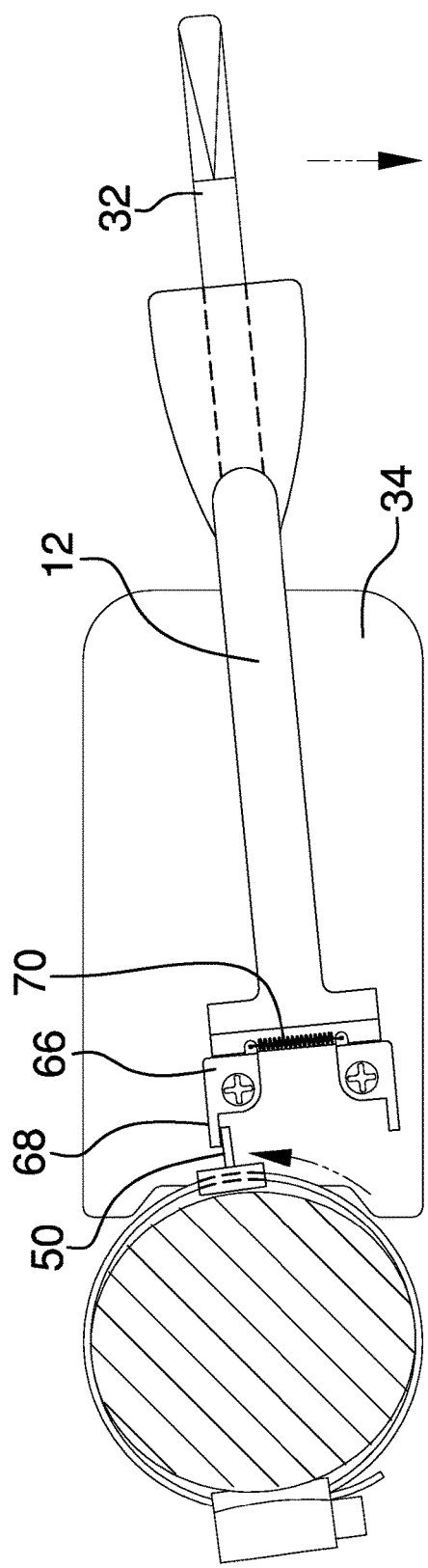
FIG. 5 is an in-use view of an embodiment of the disclosure.
Figure 6:
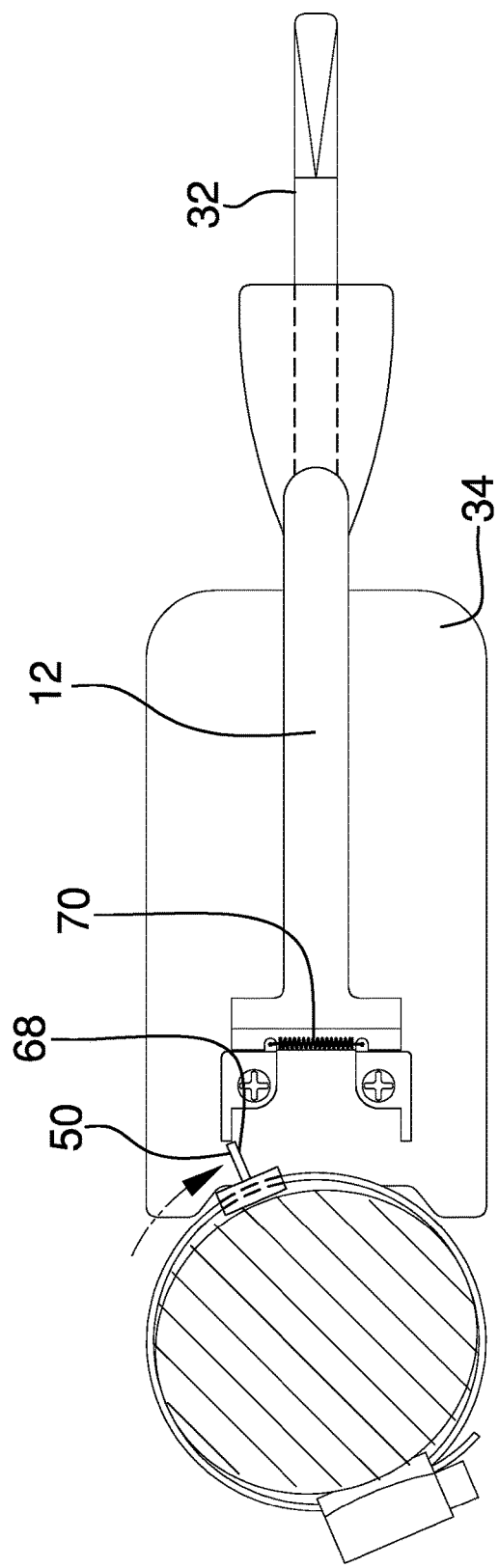
FIG. 6 is an in-use view of an embodiment of the disclosure.
Figure 7:
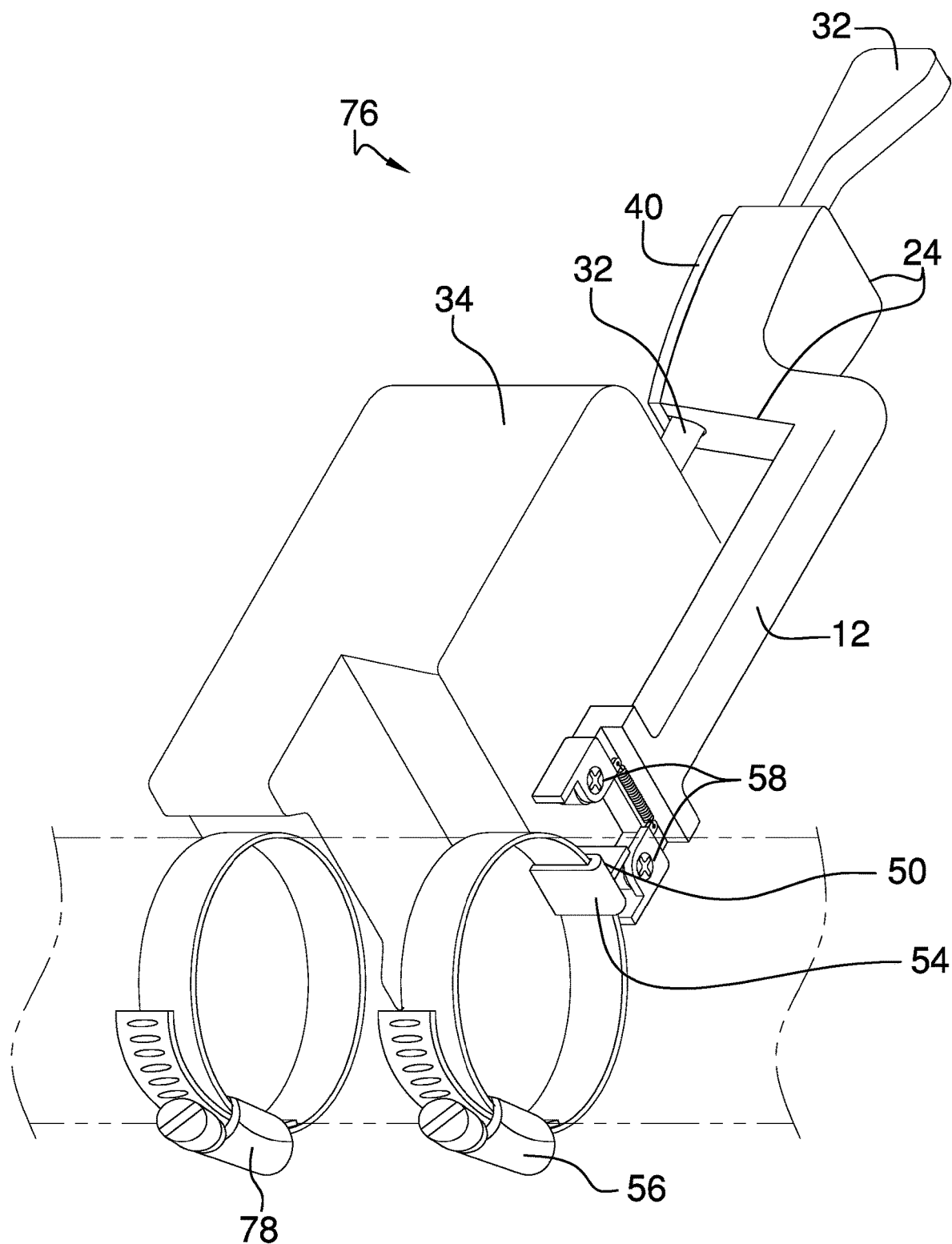
FIG. 7 is an in-use view of an embodiment of the disclosure.

In another embodiment of the invention, as shown in FIGS. 2 and 7, a kit 76 comprising the turn signal reset device 10 and a signal switch assembly 34 is provided. The kit 76 also comprises a hose clamp 78 that is coupled to the signal switch assembly 34. The hose clamp 78 is configured to couple the signal switch assembly 34 to the steering column of the vehicle. The kit 76 is intended for a vehicle that does not have a functioning signal switch assembly 34.

In use, the bolts 42 are used to couple the plate 40 to the first bar 14 so that the signal stalk 32 is fixedly coupled to the return stalk 12. The column clamp 56 is inserted into the clip 54, then positioned around and coupled to the steering column so that the tab 50 extends radially from the steering column. The side face 68 of the respective bracket 62 is positioned, with the signal stalk 32 in the neutral configuration, outside of the arc 74 that is defined by rotation of the tab 50 around the axis of the steering column. When the signal stalk 32 is activated, the side face 68 is positioned within the arc 74 and the tab 50 is positioned to contact the side face 68 of the respective bracket 62 to urge the signal stalk 32 to return to the neutral configuration.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A turn signal reset device comprising:
    a return stalk;
    a coupler coupled to a first end of the return stalk wherein the coupler is configured for coupling the return stalk to a signal stalk of a signal switch assembly coupled to a steering column of a vehicle such that the return stalk extends over the signal stalk and the signal switch assembly positioning a second end of the return stalk proximate to the steering column;
    a tab;
    a connector coupled to the tab wherein the connector is configured for coupling the tab to the steering column proximate to the signal switch assembly such that the tab extends radially from the steering column;
    an actuator coupled to a second end of the return stalk such that activating the signal stalk positions the actuator for selectively engaging the tab as the steering column rotates wherein the actuator is configured for actuating the signal stalk for resetting the signal switch assembly to a neutral configuration; and
    the return stalk comprising:
        a first bar;
        a second bar coupled to and extending substantially perpendicularly from a respective opposing endpoint of the first bar;
        a third bar coupled to and extending substantially perpendicularly from the second bar distal from the first bar such that the third bar is opposingly positioned on the second bar relative to the first bar;
        a fourth bar coupled to and extending bidirectionally from the third bar distal from the second bar such that the fourth bar is perpendicular to the second bar; and
        a fifth bar coupled to a lower surface of the fourth bar and extending opposingly to the third bar.

2. The device of claim 1, further including the actuator comprising:
a pair of extrusions, each extrusion being coupled to and extending from a respective opposing end of the fifth bar, the extrusions being arcuate distal from the fifth bar;
a pair of brackets, the brackets being L-shaped when viewed longitudinally defining a top face and a side face of the bracket, each bracket being pivotally coupled by the top face to a respective extrusion;
a spring coupled to and extending between the brackets, the spring being coupled to the top face of each bracket such that the spring is positioned over the fifth bar wherein the spring is positioned for biasing the pair of brackets to a default configuration wherein the sides face of each bracket abuts an associated extrusion such that the bracket is positioned for selectively pivoting relative to the respective extrusion concurrent with tensioning of the spring such that the bracket returns to the default configuration concurrent with rebounding of the spring; and
a pair of cutouts, each cutout being positioned in the top face of a respective bracket such that the side face of the respective bracket is positioned outside of an arc defined by rotation of the tab when the signal stalk is in the neutral configuration and wherein the side face is within the arc when the signal stalk is activated positioning the tab for contacting the side face of the respective bracket for urging the signal stalk for returning to the neutral configuration.

3. A turn signal reset device comprising:
a return stalk;
a coupler coupled to a first end of the return stalk wherein the coupler is configured for coupling the return stalk to a signal stalk of a signal switch assembly coupled to a steering column of a vehicle such that the return stalk extends over the signal stalk and the signal switch assembly positioning a second end of the return stalk proximate to the steering column;
a tab;
a connector coupled to the tab wherein the connector is configured for coupling the tab to the steering column proximate to the signal switch assembly such that the tab extends radially from the steering column; and
an actuator coupled to the second end of the return stalk such that activating the signal stalk positions the actuator for selectively engaging the tab as the steering column rotates wherein the actuator is configured for actuating the signal stalk for resetting the signal switch assembly to a neutral configuration; and
the coupler comprising
a recess positioned in a lower face of the first bar, the recess being arcuate such that the recess is complementary to the signal stalk wherein the recess is configured for inserting the signal stalk,
a pair of channels extending into a first bar of the return stalk from the lower face such that the channels bracket the recess, the channels being internally threaded,
a plate shaped complementarily to the lower face of the first bar,
a pair of holes positioned in the plate such that each hole is aligned with an associated channel when the plate is positioned over the lower face, and
a pair of bolts, the bolts being complementary to the channels wherein each bolt positioned for inserting through a respective hole and threadedly inserting into the associated channel for coupling the plate to the first bar such that the signal stalk is fixedly coupled to the return stalk.

4. The device of claim 3, further including the tab being rectangularly shaped.

5. The device of claim 3, further including the connector comprising:
a clip coupled to the tab; and
a column clamp, the column clamp being positioned for inserting the clip and configured for positioning around and coupling to the steering column proximate to the signal switch assembly such that the tab extends radially from the steering column.

6. The device of claim 3, further comprising:
the return stalk comprising:
a first bar,
a second bar coupled to and extending substantially perpendicularly from a respective opposing endpoint of the first bar,
a third bar coupled to and extending substantially perpendicularly from the second bar distal from the first bar such that the third bar is opposingly positioned on the second bar relative to the first bar,
a fourth bar coupled to and extending bidirectionally from the third bar distal from the second bar such that the fourth bar is perpendicular to the second bar, and
a fifth bar coupled to a lower surface of the fourth bar and extending opposingly to the third bar;
the tab being rectangularly shaped;
the connector comprising:
a clip coupled to the tab, and
a column clamp, the column clamp being hose-type wherein the column clamp is positioned for inserting the clip and configured for positioning around and coupling to the steering column proximate to the signal switch assembly such that the tab extends radially from the steering column; and
the actuator comprising:
a pair of extrusions, each extrusion being coupled to and extending from a respective opposing end of the fifth bar, the extrusions being arcuate distal from the fifth bar,
a pair of brackets, the brackets being L-shaped when viewed longitudinally defining a top face and a side face of the bracket, each bracket being pivotally coupled by the top face to a respective extrusion,
a spring coupled to and extending between the brackets, the spring being coupled to the top face of each bracket such that the spring is positioned over the fifth bar wherein the spring is positioned for biasing the pair of brackets to a default configuration wherein the sides face of each bracket abuts an associated extrusion such that the bracket is positioned for selectively pivoting relative to the respective extrusion concurrent with tensioning of the spring such that the bracket returns to the default configuration concurrent with rebounding of the spring, and
a pair of cutouts, each cutout being positioned in the top face of a respective bracket such that the side face of the respective bracket is positioned outside of an arc defined by rotation of the tab when the signal stalk is in the neutral configuration and wherein the side face is within the arc when the signal stalk is activated positioning the tab for contacting the side face of the respective bracket for urging the signal stalk for returning to the neutral configuration.

\* \* \* \* \*